US010075448B2

(12) United States Patent
Dubost

(10) Patent No.: US 10,075,448 B2
(45) Date of Patent: Sep. 11, 2018

(54) PASSWORD SETUP MANAGEMENT

(71) Applicant: CA, Inc., New York, NY (US)

(72) Inventor: Philippe Dubost, Prague (CZ)

(73) Assignee: CA, Inc., New York, NY (US)

(*) Notice: Subject to any disclaimer, the term of this patent is extended or adjusted under 35 U.S.C. 154(b) by 148 days.

(21) Appl. No.: 15/174,408

(22) Filed: Jun. 6, 2016

(65) Prior Publication Data

US 2017/0353470 A1 Dec. 7, 2017

(51) Int. Cl.
*H04L 29/06* (2006.01)
*G06F 21/83* (2013.01)

(52) U.S. Cl.
CPC ........... *H04L 63/102* (2013.01); *G06F 21/83* (2013.01); *H04L 63/083* (2013.01); *H04L 67/42* (2013.01)

(58) Field of Classification Search
CPC ....... G06F 21/83; H04L 63/083; H04L 67/42; H04L 63/102
USPC .................................................. 726/6
See application file for complete search history.

(56) References Cited

U.S. PATENT DOCUMENTS

| 6,832,354 | B2* | 12/2004 | Kawano | G06F 3/023 345/168 |
| 6,980,081 | B2* | 12/2005 | Anderson | G06F 21/36 340/5.51 |
| 6,993,608 | B2* | 1/2006 | Rothman | G06F 3/023 341/22 |
| 7,030,890 | B1* | 4/2006 | Jouet | G06F 9/4443 345/589 |
| 7,562,227 | B1* | 7/2009 | Cox | G06F 21/36 713/183 |
| 8,468,598 | B2* | 6/2013 | Hebert | G06F 21/554 713/183 |
| 8,520,848 | B1* | 8/2013 | Liu | H04L 63/083 380/52 |
| 9,286,451 | B2* | 3/2016 | Bao | G06F 21/36 |
| 9,632,603 | B2* | 4/2017 | Fang | G06F 3/0362 |
| 9,736,147 | B1* | 8/2017 | Mead | H04L 63/083 |
| 2003/0140258 | A1* | 7/2003 | Nelson | G06F 21/46 726/6 |

(Continued)

OTHER PUBLICATIONS

Stackexchange, "Does it indicate a bad password system to disallow certain characters in passwords?", Jan. 3, 2015, 4 pages, [online] retrieved on Mar. 10, 2016 from http://security.stackexchange.com/questions/77359/does-it-indicate-a-bad-password-system-to-disallow-certain-characters-in-passwor.

*Primary Examiner* — Syed Zaidi
(74) *Attorney, Agent, or Firm* — Gilliam IP PLLC

(57) ABSTRACT

A technique is disclosed to manage password setup such as may be integrated within a login authentication setup process. In response to an initiated password setup process associated with an active client account, a password manager determines whether at least two functional keyboard layouts are associated with the active client account. If at least two functional keyboard layouts are associated with the active client account, the password manager retrieves character position mappings for the at least two functional keyboard layouts. The password manager identifies character position inconsistencies among the at least two functional keyboard layouts based, at least in part, on the retrieved character position mappings. The password manager restricts utilization during password setup of at least one keyboard character based, at least in part, on the identified character position inconsistencies.

20 Claims, 4 Drawing Sheets

(56) References Cited

U.S. PATENT DOCUMENTS

| | | | |
|---|---|---|---|
| 2005/0154926 A1* | 7/2005 | Harris | G06F 21/46 |
| | | | 726/19 |
| 2008/0028232 A1* | 1/2008 | Bender | G06F 21/316 |
| | | | 713/186 |
| 2008/0066167 A1 | 3/2008 | Andri et al. | |
| 2008/0172735 A1* | 7/2008 | Gao | G06F 3/04886 |
| | | | 726/19 |
| 2009/0044282 A1* | 2/2009 | Govindaraju | G06F 21/83 |
| | | | 726/27 |
| 2009/0106827 A1* | 4/2009 | Cerruti | G06F 21/31 |
| | | | 726/7 |
| 2009/0133120 A1 | 5/2009 | Cannizzaro et al. | |
| 2014/0165169 A1* | 6/2014 | Buck | G06F 21/31 |
| | | | 726/7 |
| 2016/0117494 A1* | 4/2016 | Kaplan | G06F 21/36 |
| | | | 726/18 |

* cited by examiner

US 10,075,448 B2

PASSWORD SETUP MANAGEMENT

BACKGROUND

The disclosure generally relates to the field of passwords management, and more particularly to managing password setup.

A text entry interface (e.g., computer keyboard) is used to enter text information into an electronic device. Keyboards may be physical or logical and may consist of different layouts (e.g., QWERTY, Dvorak). Physical keyboard layout refers to the physical arrangement of keys on the keyboard. Functional keyboard layout refers to the associations of the physical keys with logical layout determined events such as the character values generated when the physical keys are pressed (i.e., the logical key positions). Most operating systems (e.g., Windows, Linux) allow a user to use different language and/or functional keyboard layout, such as Spanish-QWERTY or United States-Dvorak.

Passwords entered using keyboards are commonly used for user authentication such as may be utilized for accessing computer-based accounts and other resources. Password based authentication methods use credentials such as username and password to validate users' identity prior to granting access. During input, passwords are usually hidden by replacing each character entered with a uniform symbol such as "*". Differences between functional keyboard layouts in combination with uncertainty regarding active keyboard layout may present issues during password entry.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

A user might have a need to switch between multiple keyboard layouts. For example, a user may use a French keyboard layout for drafting documents but may use an English keyboard layout when drafting source code for software programs. However, because the text in a password input box is masked, users do not have the visibility on which keyboard layout is active. Often, this scenario would mean that unbeknownst to a user, he or she may be entering an unexpected character when pressing a key on the keyboard. A technique is disclosed to assist users in setting up a password that is portable between different keyboard layouts by dynamically restricting symbol inconsistencies between keyboard layouts and/or generating real-time suggestions allowing for consistent character entry despite differences in keyboard layouts.

Physical keyboard layout refers to the arrangement or placement (i.e. mechanical, visual or functional) of keys on a physical keyboard. When a key on the keyboard is pressed, the keyboard processor reads the key location in the keyboard matrix and sends a serial packet of data containing a corresponding scan code. A scan code is usually a number or sequence of numbers assigned to each key on a physical keyboard. The operating system converts the received scan code to the appropriate character using a logical keyboard layout (referred to herein as a functional keyboard layout). A character may be a letter, number, or symbol.

The password setup management mechanism ("password manager") may be a method and/or set of methods implemented by an application. The password manager may also be an application deployed in a client that is administered by a controller. The controller may be federated (i.e. administers several password managers across several clients over the network) and may include a database that records the authentication profiles, usage, components and/or devices (e.g., keyboard layouts) and the systems (e.g., the web applications clients log into).

Example Illustrations

Figure 1:
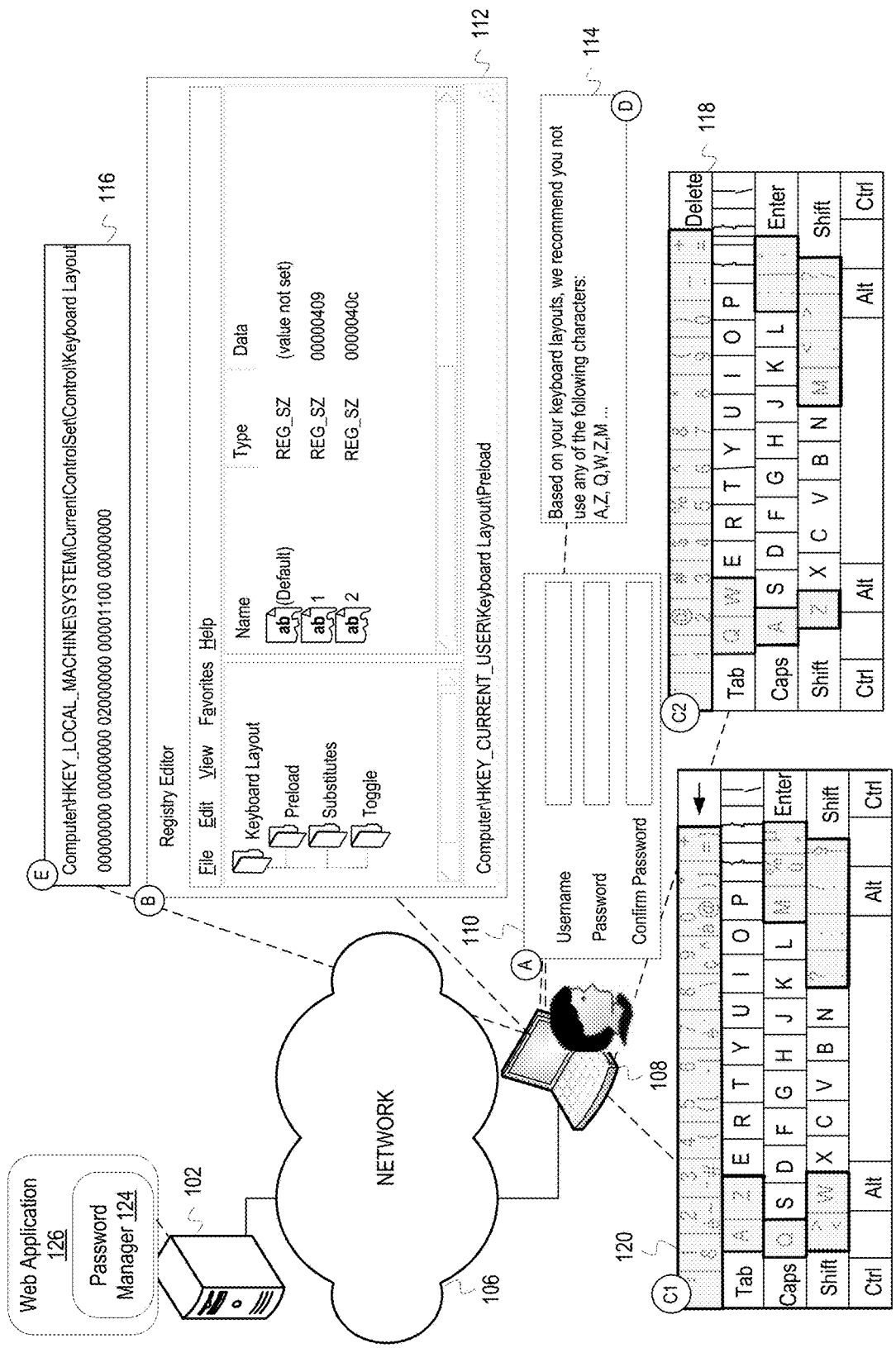
FIG. 1 is a block diagram depicting a password setup management system incorporated in a web service application.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 1 depicts a conceptual example of a networked computer systems in which a password manager is deployed within a web application. The computer systems include a web application server 102 and a client device 108. Web application server 102 hosts a web application 126 having a password setup management system ("password manager") 124. The web application 126 communicates with the client device 108 across a network 106.

An authentication process may entail an initial password setup process, such as when establishing an account, whereby a user enters login credentials such as a username and password in order to access an account. An authentication process for establishing a user account or other form of user access to the web application 126 may begin at client device 108. The authentication process may, for example, begin in response to a request for or offer of access to restricted portions of an application. Authentication mechanisms may consist of a login form or modal dialog box that prompts for credentials, usually a username and password. A login process usually requires credentials to confirm access. For web applications, credentials are usually presented using login forms embedded in a Hyper Text Markup Language (HTML) document. For non-web applications, a modal dialog box may be used instead.

At stage A, the web application 126 generates an authentication object 110. Authentication object 110 may be a form or dialog box. A form or dialog box is composed of at least a password text box into which credential(s) are entered. The authentication object 110 may be generated when a password setup process is initiated. For example, the authentication object 110 may be generated by the web application 126 when initial access to a web application's restricted resource is requested.

In web applications, authentication objects such as login forms may be used to create authentication credentials for using a service or for accessing a restricted resource. Authentication credentials may include a user account identifier and password combination. User accounts are usually defined by passwords, groups, and permissions. Various rules and/or policies may be implemented by the application or service to create or setup a user account. For example, a user account identifier or password may be restricted to specific character(s) and/or length. Typically, login setup process requires information such as username, password. In addition, passwords usually need to be confirmed by re-entering the same password in a different textbox.

At stage B, the password manager 124 determines whether at least two functional keyboard layouts are associated with the active client account within the client device 108. As utilized herein, an active client account may by a currently activated operating system account that is associated with a particular user/client. Various techniques may be used in determining keyboard layouts associated with the active client account. For example, in a Windows® operating system, the keyboard layout usage data may be retrieved by accessing client profile information from the operating system registry under HKEY_LOCAL_MACHINE\SYSTEM\CurrentControlSet\Control\Keyboard Layout. In FIG. 1, registry 112 includes data for two keyboard layouts: US Keyboard (QWERTY) and the French keyboard (AZERTY).

If at least two functional keyboard layouts are determined to be associated with the active client account, the character position mappings of the keyboard layouts are retrieved. A keyboard may adhere to one of three standards: International Organization for Standardization (ISO), (ISO/IEC 999502), American National Standards Institute (ANSI), (ANSI-IN-CITS 154-1988), and Japanese Industrial Standards (JIS), (JIS X 6002-1980). For example, the password manager 124 may determine that the input device is a standard ISO US keyboard with two enabled keyboard layouts: US QWERTY 118 and French AZERTY 120. In Unix®, the command "setxkbmp" can be used to obtain the character position mappings of the keyboard layout for example. Of the two enabled keyboard layouts, the password manager 124 may detect that at least one of the functional keyboard layouts is active. In Windows operating system a call to the function "CurrentInputMethodLanguageTag" may be utilized to obtain the currently active keyboard layout.

At stage C1 and C2, the password manager 124 determines whether two or more functional keyboard layouts are logically associated within the operating system registry with the active client account. For example, the password manager 124 may determine that the physical keyboard device is a standard ISO US keyboard and that two functional keyboard layouts are associated with a current operating system account. For example, the registry entry in Computer\HKEY_CURRENT_USER\KeyboardLayout\Preload shows the 2 keyboard layouts that are associated with the current logged-in user. In the depicted example, the two associated keyboard layouts comprising the English keyboard layout QWERTY 118 and the French keyboard layout AZERTY 120 depicted in registry 112 as entry 1 with value 00000409 and entry 2 with value 0000040c respectively. To get the current active keyboard layout, the password manager 124 may call Windows application program interface (API) function GetKeyboardLayoutName. In addition, certain metrics relative to keyboard usage level data may be determined, such as which keyboard layout is predominantly used. For example, if the same keyboard layout is used by the current user, systems accounts and new user accounts, then that keyboard layout is probably predominant.

In response to determining that the currently active client account is associated with at least two functional keyboard layouts, the password manager 124 retrieves character position mappings for each of the layouts. As utilized herein, a character position mapping represents the associations of individual keys and corresponding scan codes to corresponding alphanumeric and symbol characters. Based on the retrieved character position mappings, the password manager 124 identifies which, if any, characters are mapped differently for the QWERTY 118 layout as compared with the AZERTY 120 layout. As shown for the depicted QWERTY and AZERTY layouts 118 and 120, some of the characters are mapped to the same physical keyboard locations and some are mapped to different keyboard locations. For example, the character "W" is mapped to the key in position D02 for the ISO 646 (ISO basic Latin alphabet standard) in the AZERTY layout 120. In contrast, the QWERTY layout 118 maps the character "Z" to the same D02 key position. The password manager 118 may identify additional character position inconsistencies between the AZERTY layout 120 and the QWERTY layout 118, such as the mappings of A and Q to the same physical keyboard key positions.

At stage D, and based on the determined inconsistencies, the password manager 124 can restrict utilization of at least one inconsistently mapped character. The utilization restriction is implemented during and in association with the password setup process (i.e., during the interval over which the displayed authentication object 110 is active). The utilization restriction may be implemented as and/or enhanced by a displayed message that identifies the characters included in the inconsistent mappings. The utilization restriction may additionally or alternatively be implemented by disabling entry of one or more keyboard characters during the password setup process. In this example, the password manager 124 may determine that two characters are mapped to the same scan code (i.e., the same physical keyboard key position) should be disabled. The disabled characters corresponding to keyboard keys are greyed out as depicted in the functional keyboard layouts US QWERTY 118 and French AZERTY 120.

After identifying characters having inconsistent character position mappings, the password manager 124 may determine that restricting utilization of all the characters having character position inconsistencies between the two layouts may result in an excessively limited number of characters available to be included in the password. In such a case in which, for example, the password manager 124 determines that the number of character position inconsistencies exceeds a specified threshold, the password manager 124 may determine not to restrict utilization of the keyboard character for password setup processing. Instead, the password manager 124 may generate a displayed message specifying the identities of each of the associated functional keyboard layouts and further indicating that the layouts are substantial inconsistent.

At stage D, the password manager 124 may also generate a message that identifies at least one character that is mapped differently for one of at least two keyboard layouts and display the message in display box 114. The password manager 124 may use various techniques to generate a message. The generated message may be based on the determined keyboard layout usage associated with the active client in device 108. In addition, it may also be based on the policy of the application. For example, the application may set a policy that certain character(s) are not allowed when creating a password. In response to such determination, the password manager 124 may also disable those character(s) in addition to the characters needed to be disabled based on keyboard layout usage in stage C1 and C2.

The utilization restriction using character entry disablement is depicted at stage E which shows scan code key entries for a Windows desktop. For each character position inconsistency, the inconsistent positions (i.e., keyboard layout positions to which each of the two keyboard layouts maps a different character) may be disabled by setting the binary data in the scan code map key in the registry. The registry key that contains the scan code map is: Computer\HKEY_LOCAL_MACHINE\SYSTEM\CurrentControlSet\Control\Keyboard Layout. An example format of the scan code map key is depicted in registry entry 116. The scan code map value is divided into five groups of four bytes. The first group represents the header version, the second group represents the header flags, the third group represent the number of mappings including the null terminator, the fourth group represents the map entry (the desired scan code and the key to be remapped), and the last group represents the null terminator. For example, to disable the key for the letter "W" the scan code mapping may be altered as depicted in registry 116. In the example, the third group in the scan code map is set to 02000000 representing 1 entry (i.e. one key to be remapped). The fourth group is set to 00001100 where in the first four zeroes represents the key to be mapped to, in this case to nothing (i.e. disabling the key); while 1100 is the hexadecimal code for the letter "W". Restricting utilization of certain characters is only performed during the password setup process. Any restriction(s) will be reverted upon after the password has been setup.

Figure 2:
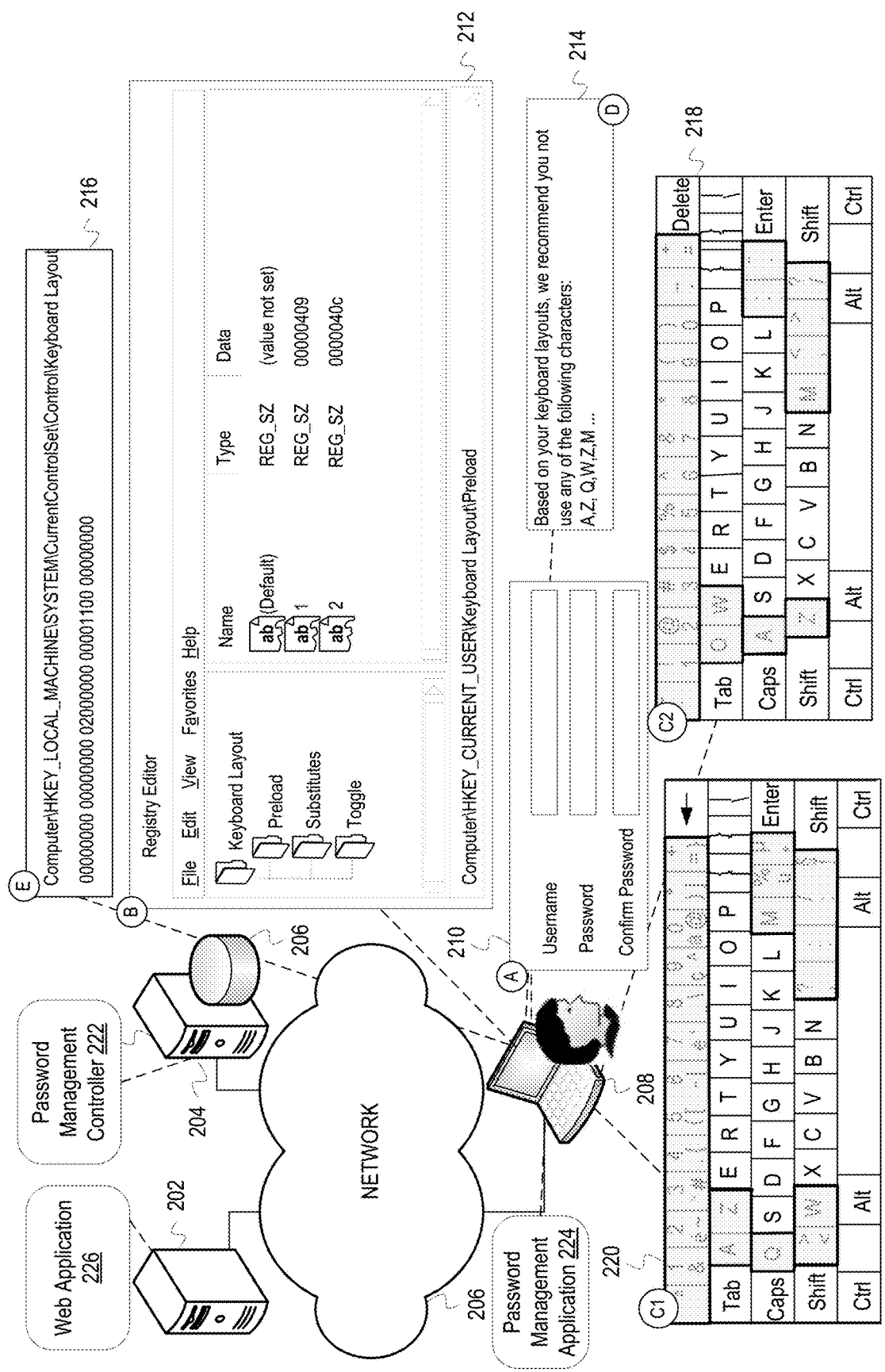
FIG. 2 is a block diagram illustrating a federated password setup management system in accordance with some embodiments.

FIG. 2 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 2 is a conceptual example of a networked computer systems in which a password manager is deployed in federated manner. FIG. 2 depicts an authentication manager server ("server") 204, web application server 202, and client device 208. Server 204 hosts password management controller ("controller") 222. Client device 108 hosts password management application ("password application") 224. Web application server 202 hosts web application 226. Server 204 hosts password management controller ("controller") 222 and controller data store ("data store") 206. The controller 222 communicates with password application 224 across a network 206.

Initially, an authentication process for web application 226 begins at client device 208. An authentication process usually begins when access to an application's restricted section is requested. Authentication mechanisms typically consists of a login form or modal dialog box that prompts for credentials, usually a username and password. A login process usually requires credentials to confirm access. For web applications, credentials are usually presented using login forms embedded in a Hyper Text Markup Language (HTML) document. For non-web applications, a modal dialog box may be used instead.

At stage A, the password application 224 detects a login setup object 210. Login setup object 210 is a form or dialog box. A form or dialog box is composed of at least a password text box into which credential(s) are entered. The login setup object 210 may be detected in several instances. For example, a login setup object may be detected when access to a web application's restricted resource is requested for the first time.

In web applications, login forms may be used to enter or create authentication credentials to use a service or access a restricted resource. Authentication credentials may include a user account identifier and password combination. User accounts are usually defined by passwords, groups, and permissions. Various rules and/or policies may be implemented by the application or service to create or setup a user account. For example, a user account identifier or password may be restricted to specific character(s) and/or length. Typically, login setup process requires information such as username, password. In addition, passwords need to be confirmed by re-entering the same password in a different textbox.

In web based applications, HTML tags may be used to detect login forms. For example, a login screen may be detected by identifying a HTML form element by detecting a <form> tag. HTML forms further contains other elements such as input and submit buttons. After detecting the form, the password management service then detects for the presence of an input element type password such as <input type="password" name="password">. In login-setup, a second input type password may be detected. Input elements allows users to input and edit data. Type attribute controls the data type of the element. A password type is a text field that obscures data entry allowing for a more secure text input.

For Windows desktop applications, the password application 224 may detect a login window by leveraging the windows management instrumentation (WMI) infrastructure and listening for process activities such as a process starting (e.g., LogonUI.exe). A login dialog usually appears for example, when the Winlogon desktop is active. A Winlogon desktop is active when a user presses the SAK, or when the User Account Control (UAC) dialog box is open, for example. In another implementation, an agent may be deployed at client devices to detect authentication objects and/or processes. In another example, the password application 224 may use semantic analysis to identify processes that is relative to the login setup.

At stage B, the password application 224 determines keyboard layout usage data within the client device 208. Determining the keyboard layout usage includes determining the enabled keyboard layouts 212 for the active account. Various techniques similar to FIG. 1 may be used in determining keyboard layout usage level data.

At stage C1 and C2, the password application 224 determines the variations and commonalities between the functional layouts of the detected keyboard devices. For example, the password application 224 may determine that the input device is a standard ISO US keyboard with two enabled keyboard layouts: US QWERTY 218 and French AZERTY 220. Similar to FIG. 1, the password application 124 then determines the different characters mapped to a specific physical location in the keyboard as depicted in FIG. 2 registry entry 216.

The password application 224 may determine that the inconsistent keys that are mapped to at least two scan codes should be restricted. In this example, the disabled keys are greyed out as depicted in keyboard layouts US QWERTY 218 and French AZERTY 220. Determination may include data such as the location of the client device (i.e. client is in the US vs France), the historical data (e.g., user historically uses the US QWERTY keyboard when providing credentials), the current active input device (e.g., standard US keyboard hardware on a desktop), and the active input locale (e.g., American English). For example, in a Windows device, the registry subtree HKEY_CURRENT_USER contains the user profile for the user who is currently logged in the device. The user profile includes various information such as desktop settings, application preferences and environment variables.

At stage D, the password application 224 may also generate a message that identifies at least one character that is mapped differently for one of at least two keyboard layouts and display the message in display box 214. Similar to FIG. 1, the password application 224 may use various techniques to generate a message. The generated message may be based on the determined keyboard layout usage enabled in the client device and/or the action performed by the password application 224. In another example, the generated message may be based on the rules and/or policies of password creation of the application or service wherein a user account is being setup. The password application 224 may use semantic analysis to analyze the rules and/or policies of password creation. For example, the application may determine that certain character(s) are not allowed when creating a password. In response to such determination, the application may also disable that certain character(s) in addition to the characters that needed to be disabled based on keyboard layout usage in stage C1 and C2.

Similar to FIG. 1, at stage E, in Windows desktops, the utilization of the inconsistent keys may be restricted by setting the binary data in the scan code map key in the registry.

Figure 3:
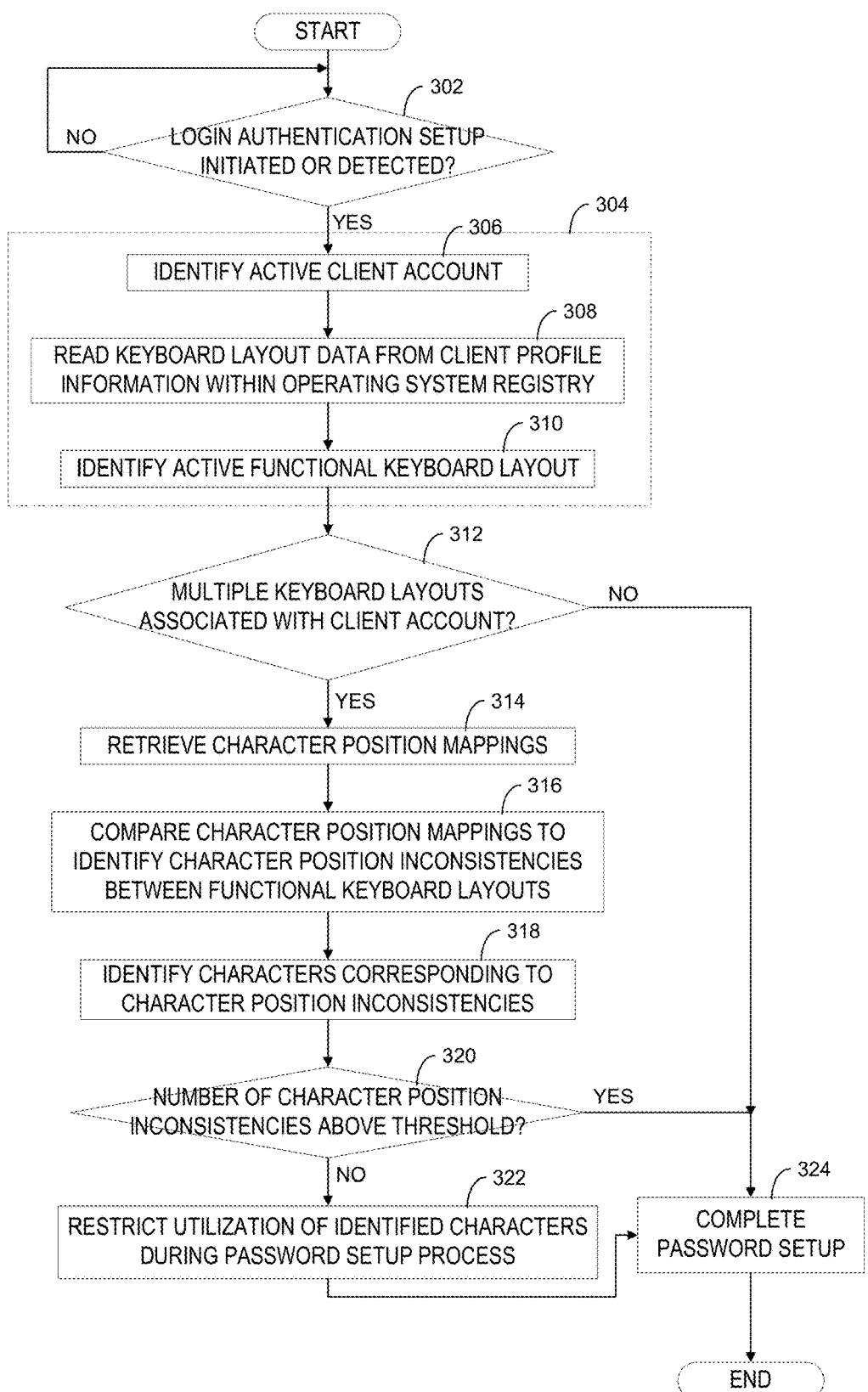
FIG. 3 depicts a flow diagram depicting operations and functions for managing a password setup process in accordance with some embodiments.

FIG. 3 depicts a flow diagram depicting operations and functions for managing a password setup process in accordance with some embodiments. The operations and functions depicted in FIG. 3 may be performed by password managers such as depicted in FIGS. 1 and 2, or any suitable component.

The process begins as shown at block 302 with a login authentication setup process being either initiated and/or detected by a password manager. In some embodiments, such as depicted in FIG. 1, the password manager is integrated with an authentication setup function of an application, such as a web server application. When so integrated, the password manager activates upon initiation of a login authentication setup process. For embodiments in which the password manager is deployed independently of the web server application, the password manager may detect for a given host client whether a login authentication setup process has been initiated. For example, the password manager may operate as a background process on a client device and be configured to detect a login setup object and/or an event associated with initiation of a login authentication setup process. The password manager may be a server application component, a client application or system component, or a combination. The password manager may also be a standalone application and/or agent that is deployed in the client by a password management controller. In such instances, the application and/or agent may communicate the login authentication setup event to the password management controller which may perform the processing.

In response to initiation or detection of the login authentication setup process, the process continues at superblock 304 with the password manager determining whether at least two functional keyboard layouts are associated with an active client account in the client device. The determination includes the password manager identifying the currently active client account (block 306). For example, in Windows operating system identifying the active client account may involve retrieving information such as username, user profile and domain from the registry key Computer\HKEY_CURRENT_USER\Volatile Environment. Having identified the active client account, the password manager accesses client profile information in the operating system registry to read keyboard layout data associated with the client account (block 308). Among the information in the active client profile and keyboard layout data may be keyboard usage that may specify whether or not and to what extent each of one or more functional keyboard layouts are utilized by client account.

The determination at superblock 304 further includes the password manager identifying the functional keyboard layout that is currently activated (block 310). In some embodiments, the determination of whether a given functional keyboard layout is associated with the active client account is based, at least in part, on detecting which keyboard layout is currently active and on the usage data for other keyboard layouts specified in the registry. In Windows, for example, functional keyboard layouts are categorized as input locales. Input locales can be specified using a language identifier (e.g., en-US) or by a pairing(s) of a hexadecimal identifiers of the input language (e.g., US English) with an input method (e.g., keyboard). For example, for en-US the hexadecimal value is 0409:00000409. The value 0409 refers to the input language and the value 00000409 represents the keyboard layout. There may be multiple input locales installed, and users can switch between them. For example, to set the input locale to English (US) or French (France) the password management application may add a keyboard layout value in the registry. For clients using the Linux operating system, the password management system may use the command "localectl status" to determine the current keyboard configuration and localized settings.

The password manager continues processing the login authentication setup process based on whether more than one keyboard layout is associated with the active client. If only one keyboard layout is determined to be associated with the active client account, the password manager completes the password setup process that is integral to the login authentication setup without accounting for keyboard layout inconsistencies (blocks 312 and 324). If the active client account is determined to be associated with at least two functional keyboard layouts, the password manager begins a process to identify character position inconsistencies between the determined keyboard layouts. Beginning as shown at block 314, the password manager retrieves character position mapping information for each of the functional keyboard layouts determined to be associated with the active client account. For example, in response to determining that the active client account is associated with QWERTY and AZERTY keyboard layouts, the password manager retrieves information specifying which characters are mapped to which keyboard key positions for each of the layouts. In Linux operating system for example, the character position mapping information may be retrieved by using the command dumpkeys.

Next, as shown at block 316, the password manager compares the character position mapping information of one of the functional keyboard layouts with the position mapping information for another of the layouts to determine inconsistencies. For example, if a keyboard key position for a first layout is mapped to a different character (e.g., "A" for AZERTY) than a character to which the same key position is mapped (e.g., "Q" for QWERTY), the password manager identifies the character position inconsistency including identifying the characters (e.g., "A" and "Q") associated with the inconsistency (block 318).

At shown at block 322, the password manager may restrict utilization of the inconsistently mapped characters during password setup processing. However, the password manager may not restrict utilization of the characters if such restriction substantially limits the set of available password-eligible characters. At block 320, for example, the password manager may determine whether the number of character position inconsistencies exceeds a specified threshold number. If so, the password manager completes password setup processing without restrictions that are based on position inconsistencies between functional keyboard layouts (blocks 320 and 324). If the number of character position inconsistencies is equal to or less than the specified threshold, the password manager executes instructions to restrict utilization of one or more of the characters identified in association with the position inconsistencies (block 322).

Restriction utilization of one or more characters may be performed by re-mapping the scancode of a particular key. In Linux for example, the command setkeycodes may be used to remap the scancodes. In other embodiments, the utilization restriction may be accomplished by generating and displaying a message block that specifies the determined position inconsistencies, or identified character associated with the position inconsistencies to the active user. In Linux, the command notify-send may be used to generate and display a message.

Variations

Although the examples above typically describe determining keyboard layouts password management application may use other identifiers in determining applicable rules and/or actions in assisting the authentication process. For example, the password management application may use locale identifiers instead of the keyboard layouts.

The examples often refer to a "application." The application is a construct used to refer to implementation of functionality for password managements. This construct is utilized since numerous implementations are possible. An application may be a system, method, program code/instructions, a particular component or components of a machine (e.g., a particular circuit card enclosed in a housing with other circuit cards/boards), machine-executable program or programs, firmware, a circuit card with circuitry configured and programmed with firmware for password management, etc. The term is used to efficiently explain content of the disclosure. The application can also be referred to as module and/or system. Although the examples refer to operations being performed by an application, different entities can perform different operations. For instance, a dedicated co-processor or service specific integrated circuit can determine rules to be applied when the criteria are met.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 304 and 306 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
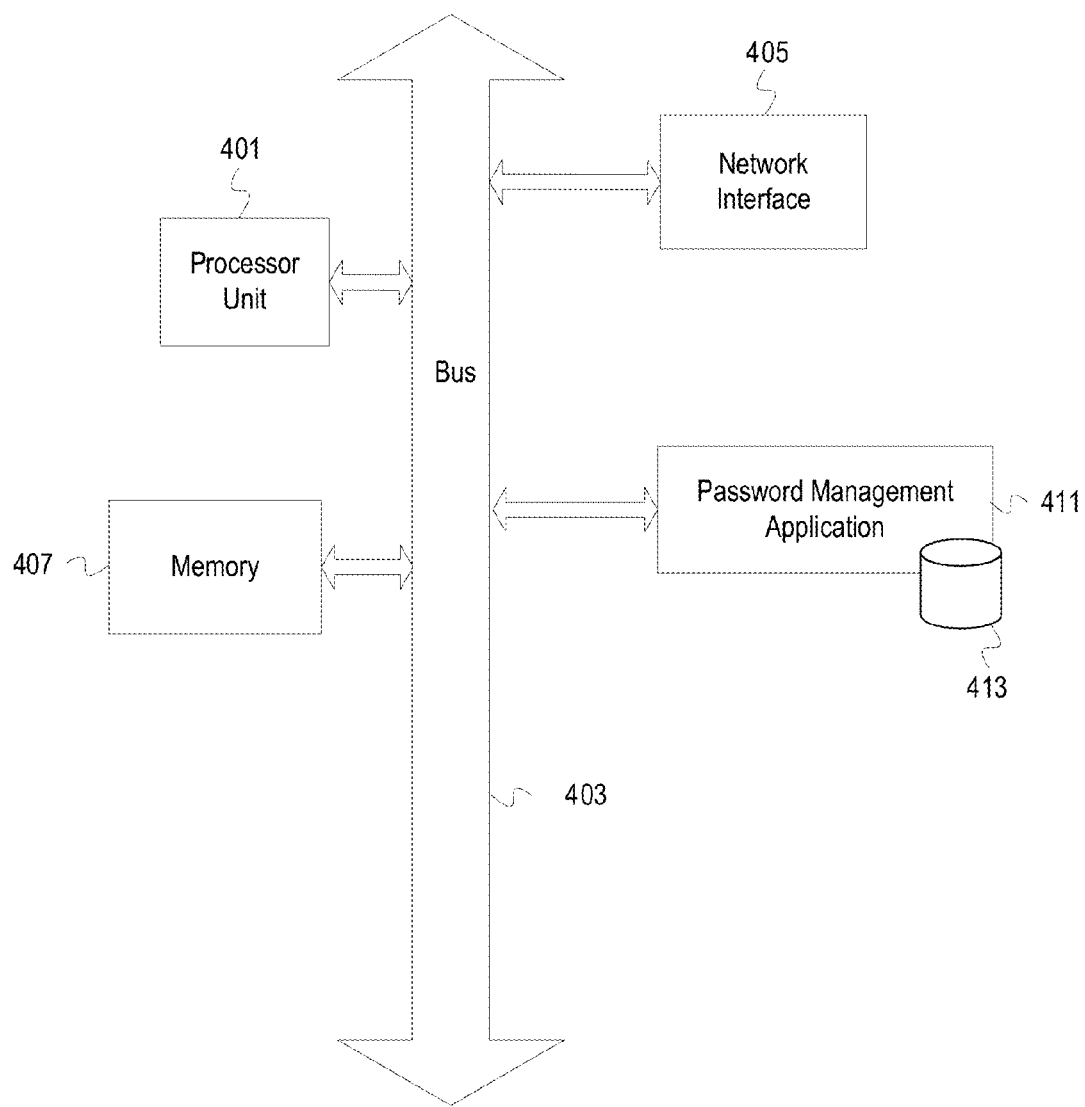
FIG. 4 depicts an example computer system with a password setup management system.

FIG. 4 depicts an example computer system with a password management application. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes a password management application 411. The password management application 411 includes functionality for detecting keyboard layout(s), detecting criteria, determining applicable rules and/or action(s) based, at least in part on the keyboard layout and/or criteria, generating list of probable rule(s) and/or action(s) and generating authentication profile. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for password management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "criteria" means one or more criteria. Thus, if an example refers to "criteria," the criteria may be a single criterion.

As used herein, the term "password setup" means password setup and/or update. Thus, for example refers to initial password creation and/or update.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method for managing password setup, said method comprising:
    in response to an initiated password setup process associated with an active client account, determining whether at least two functional keyboard layouts are associated with the active client account;
    based on determining that at least two functional keyboard layouts are associated with the active client account, retrieving character position mappings for the at least two functional keyboard layouts;
    identifying character position inconsistencies among the at least two functional keyboard layouts based, at least in part, on the retrieved character position mappings; and
    restricting utilization during password setup of at least one keyboard character based, at least in part, on the identified character position inconsistencies.

2. The method of claim 1, wherein said determining whether at least two functional keyboards are associated with the active client account includes:
    accessing client profile information from an operating system registry; and
    retrieving functional keyboard usage data from the client profile information.

3. The method of claim 1, further comprising:
    detecting that one of the at least two functional keyboard layouts is currently active; and
    reading usage level data for the other of the at least two keyboard layouts.

4. The method of claim 3, further comprising determining that the at least two functional keyboard layouts are associated with the client account based, at least in part, on,
    said detecting that one of the at least two functional keyboard layouts is currently active; and
    the usage level data for the other of the at least two keyboard layouts.

5. The method of claim 1, wherein said identifying character position inconsistencies among the at least two functional keyboard layouts comprises comparing character position mappings of a first of the at least two functional keyboard layouts with character position mappings of a second of the at least two functional keyboard layouts.

6. The method of claim 1, further comprising identifying one or more characters corresponding to one or more of the identified character position inconsistencies, and wherein said restricting utilization of at least one keyboard character includes generating a message that specifies the one or more identified characters.

7. The method of claim 6, wherein said restricting utilization of at least one keyboard character includes, in response to detecting entry of one of the identified one or more characters into a displayed password entry field, displaying the message specifying the entered character.

8. The method of claim 1, further comprising initiating the password setup process in association with the active client account, wherein said password setup process includes said determining whether at least two functional keyboard layouts are associated with the active client account.

9. The method of claim 1, further comprising:
detecting the password setup process; and
in response to detecting the password setup process, determining whether at least two functional keyboard layouts are associated with the active client account.

10. One or more non-transitory machine-readable media having program code for managing password setup stored therein, the program code to:
in response to an initiated password setup process associated with an active client account, determine whether at least two functional keyboard layouts are associated with the active client account;
based on a determination that at least two functional keyboard layouts are associated with the active client account, retrieve character position mappings for the at least two functional keyboard layouts;
identify character position inconsistencies among the at least two functional keyboard layouts based, at least in part, on the retrieved character position mappings; and
restrict utilization during password setup of at least one keyboard character based, at least in part, on the identified character position inconsistencies.

11. The machine-readable media of claim 10, wherein the program code to determine whether at least two functional keyboards are associated with the active client account includes program code to:
access client profile information from an operating system registry; and
retrieve functional keyboard usage data from the client profile information.

12. The machine-readable media of claim 10, wherein the program code further includes program code to:
detect that one of the at least two functional keyboard layouts is currently active; and
read usage level data for the other of the at least two keyboard layouts.

13. The machine-readable media of claim 12, further comprising program code to determine that the at least two functional keyboard layouts are associated with the client account based, at least in part, on,
said detecting that one of the at least two functional keyboard layouts is currently active; and
the usage level data for the other of the at least two keyboard layouts.

14. The machine-readable media of claim 10, wherein the program code to identify character position inconsistencies among the at least two functional keyboard layouts includes program code to compare character position mappings of a first of the at least two functional keyboard layouts with character position mappings of a second of the at least two functional keyboard layouts.

15. The machine-readable media of claim 10, further comprising program code to identify one or more characters corresponding to one or more of the identified character position inconsistencies, and wherein the program code to restrict utilization of at least one keyboard character includes program code to generate a message that specifies the one or more identified characters.

16. The machine-readable media of claim 15, wherein the program code to restrict utilization of at least one keyboard character includes program code to, in response to detecting entry of one of the identified one or more characters into a displayed password entry field, display the message specifying the entered character.

17. An apparatus comprising:
a processor; and
a machine-readable medium having program code executable by the processor to cause the apparatus to,
in response to an initiated password setup process associated with an active client account, determine whether at least two functional keyboard layouts are associated with the active client account;
based on a determination that at least two functional keyboard layouts are associated with the active client account, retrieve character position mappings for the at least two functional keyboard layouts;
identify character position inconsistencies among the at least two functional keyboard layouts based, at least in part, on the retrieved character position mappings; and
restrict utilization during password setup of at least one keyboard character based, at least in part, on the identified character position inconsistencies.

18. The apparatus of claim 17, wherein the program code further includes program code executable by the processor to cause the apparatus to:
detect that one of the at least two functional keyboard layouts is currently active; and
read usage level data for the other of the at least two keyboard layouts.

19. The apparatus of claim 18, further comprising program code executable by the processor to cause the apparatus to determine that the at least two functional keyboard layouts are associated with the client account based, at least in part, on,
said detecting that one of the at least two functional keyboard layouts is currently active; and
the usage level data for the other of the at least two keyboard layouts.

20. The apparatus of claim 17, further comprising program code executable by the processor to cause the apparatus to identify one or more characters corresponding to one or more of the identified character position inconsistencies, and wherein the program code to restrict utilization of at least one keyboard character includes program code to generate a message that specifies the one or more identified characters.

* * * * *